Oct. 10, 1967  D. L. THOMAS  3,346,358
METHOD OF PRESS BENDING VERTICALLY SUSPENDED GLASS SHEETS
Filed April 15, 1964
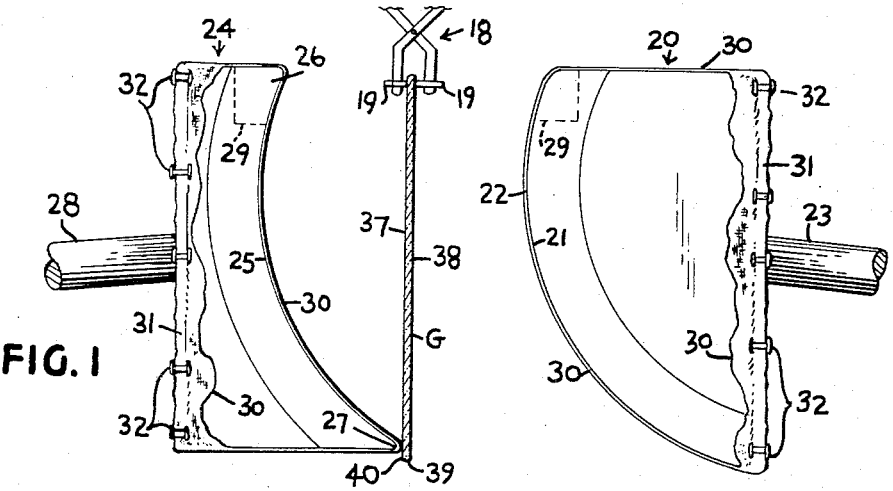
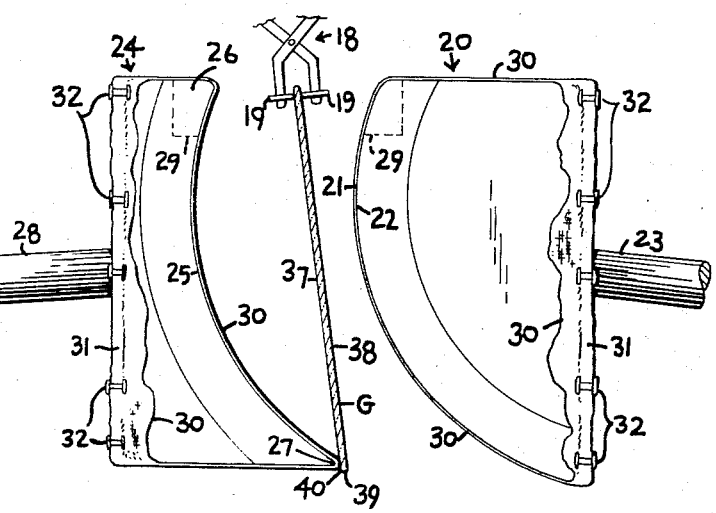
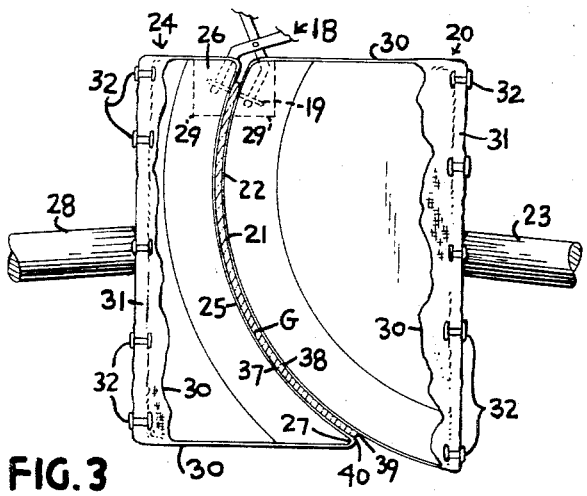
INVENTOR.
DEAN L. THOMAS
BY Chisholm and Spencer
ATTORNEYS

# United States Patent Office 3,346,358
Patented Oct. 10, 1967

3,346,358
METHOD OF PRESS BENDING VERTICALLY SUSPENDED GLASS SHEETS
Dean L. Thomas, Crestline, Ohio, assignor to Pittsburgh Plate Glass Company, Pittsburgh, Pa., a corporation of Pennsylvania
Filed Apr. 15, 1964, Ser. No. 359,895
3 Claims. (Cl. 65—106)

ABSTRACT OF THE DISCLOSURE

Press bending glass sheets by sandwiching the sheets between complementary convex and concave shaping members having a cover subject to wear involving engaging a major surface of the glass sheet with the concave shaping member in such a manner that an edge of the concave shaping member initially contacts the major glass sheet surface in a location spaced from a correponding edge of the sheet.

This application relates to bending glass sheets and particularly relates to a press bending operation in which a heat-softened glass sheet is supported in a substantially vertical plane in spaced relation between two glass shaping members having complementary shaping surfaces of convex and concave configuration about horizontal axes of curvature. The glass is shaped by being sandwiched between the shaping members while the glass is in a plastic condition.

The present application involves an improvement over the press bending methods recited in U.S. Patents Nos. 3,290,133 and 3,290,136 of Dean L. Thomas, both issued on Dec. 6, 1966. The present invention is especially useful in improving the life of fiber glass covers used with the glass shaping members, particularly the cover for the concave shaping member.

In an illustrative press bending operation disclosed in the aforesaid patent applications, the disclosure of which is incorporated herein by reference, the glass sheet is supported in a vertical plane by being gripped at its upper edge by tongs. The glass shaping surfaces of the shaping members of the illustrative embodiment are tilted in such a manner that a portion above the center line of the vertical dimension of the shaping surfaces is tangent to a vertical plane. The concave shaping surface contacts the corner line formed between one of the major surfaces of the glass sheet and the bottom edge of the glass sheet when it makes its initial contact with the glass sheet during its shaping.

When the bottom edge corner line of the glass sheet rubs against the shaping surface cover, it reduces the life of the fiber glass cover of the concave shaping member somewhat. When the glass sheet is bent to relatively sharp curvatures, the angle formed between the lower portion of the concave shaping member and the major glass sheet surface near the bottom edge corner line of the glass sheet becomes considerable and the sharp corner at the glass sheet bottom edge rubbing against the concave shaping member as the latter moves inward causes the fiber glass cover of the concave glass shaping member to wear quite rapidly.

It is an object of the present invention to minimize the wear of the cover for a glass shaping member, particularly the concave glass shaping member, during a press bending operation.

This and other objects of the present invention will be more clearly understood in the light of a description of a particular embodiment which follows.

In the drawings which form part of the present description, and wherein like reference numerals are applied to like structural elements, FIG. 1 is a schematic view showing the relative position of a pair of glass shaping members relative to a glass sheet supported vertically for shaping at the moment when the concave shaping member makes initial contact with the glass;

FIG. 2 is a view similar to FIG. 1, showing the relative position of the shaping members and the glass during an intermediate stage of the bending operation; and FIG. 3 is a similar view showing the position of the shaping members sandwiching the glass sheet therebetween at the end of the shaping operation.

Referring to the drawings, reference number 18 refers to glass gripping tongs that are preferably provided with glass gripping elements 19 that apply opposing forces through the glass thickness to hang a glass sheet G therefrom in a vertical plane. Preferably, the glass gripping elements are tongs described and claims in U.S. Patent No. 3,089,727 of William J. Hay, issued May 14, 1963, for "Supporting Glass Sheets."

The glass shaping apparatus comprises a first glass shaping member 20 having a convex shaping surface 21. The outermost portion of the convex shaping surface is above the mid-point of the vertical dimension of the shaping member and is indicated by reference number 22. An actuating piston 23 is mounted to the rear of the convex glass shaping member 20 to urge the latter to move along an axis defined by the length of the piston rod 23 toward and away from a position in a vertical plane along which a succession of glass sheets G is transported.

At the other side of the position in the vertical plane, a second glass shaping member 24 is located. The latter has a concave shaping surface 25 which conforms to and is substantially complementary to the convex shaping surface 21 of convex glass shaping member 20. The difference in radius of curvature between the shaping surfaces 21 and 25 is substantially equal to the thickness of glass to be shaped and thus permits the insertion of a glass sheet of finite thickness therebetween. Each glass sheet in succession occupies the position in said vertical plane between said shaping members 20 and 24 when ready for shaping.

The concave shaping surface 25 has an upper edge portion 26 and a lower edge portion 27. An actuating piston 28 is mounted to the rear of concave glass shaping member 24 to urge the latter to move along an axis defined by the length of the piston 28.

When the glass shaping members 20 and 24 are in mating engagement with one another and sandwiching a glass sheet G therebetween, clearance must be provided for the tongs 18. These clearances are notched-out portions of the glass shaping members depicted by reference character 29.

The glass shaping members are composed of a heat resistant material, such as cast steel, provided with a cover 30 of one or more layers of stretchable knit fiber glass. U.S. Patent No. 3,148,968 of James H. Cypher and Clement E. Valchar, issued Sept. 15, 1964, discloses and claims a suitable cover material of this type. A flat metal frame 31 disposed generally parallel to the plane of the flat glass sheet is attached to the rear of each shaping member. Covers 30 are held against the shaping surfaces in slightly stretched condition and are folded to the rear of the respective shaping members and clamped to the frames 31 by spaced spring-loaded clamps 32.

The pistons 23 and 28 are movably mounted in piston cylinders to urge the glass shaping members 20 and 24 toward and away from mating engagement with one another. The piston cylinders are rigidly supported by a support frame for the glass shaping station (not shown).

A glass sheet G has a first major surface 37 facing concave shaping member 24, and a second major surface 38 facing convex shaping member 20 when in position to be shaped. The bottom edge surface 39 forms a sharp corner 40 with the first major surface 37.

The present invention takes advantage of the benefits obtained from moving the glass shaping members in obliquely upward and simultaneous inward movement toward one another and from tilting their shaping surfaces in such orientations that a tangent to a portion above the mid-plane of the vertical dimension of the shaping surfaces is parallel to a vertical plane such as application disclosed in U.S. patent application No. 3,290,136, of Dean L. Thomas, issued Dec. 6, 1966. The present invention also utilizes sequential contact of the glass sheet by the glass shaping members as claimed in U.S. Patent No. 3,162,521 of James H. Cypher, issued Dec. 22, 1964.

The latter technique controls movement of the convex shaping member 20 and that of the concave shaping member 24 so that the lower edge portion 27 of the concave shaping surface 25 of the concave glass shaping member 24 initially contacts the bottom edge of the glass sheet G and tilts the sheet toward the convex shaping member before the latter contacts the glass.

Prior to the present invention, it was considered necessary to have the margin of the flat glass sheet completely encompassed within the margin of the glass shaping members throughout the press bending cycle. Both shaping members had outlines surrounding areas larger than the flat sheet before bending.

Using such apparatus caused the stretchable cover 30 of the concave glass shaping member 24 to rub against the sharp corner 40 and wear out quickly. The present invention enables the fiber glass cover 30 to rub against a relatively smooth surface 37 of the glass sheet G instead of the sharp corner. This change reduces rubbing wear and results in extended life for the fiber glass covers.

According to the present invention, the concave glass shaping member 24 is constructed and arranged to have its shaping surface define an arc of smaller arcuate distance than that of the shaping surface of the convex shaping member. Hence, its lower edge portion 27 moves into its initial contact with the heat-softened glass sheet G at its smooth major surface 37 slightly above the bottom edge 39 thereof. This initial contact of the bottom edge portion 27 of the concave shaping member 24 is made with the glass sheet while the upper edge portion 26 of the concave shaping surface 25 is still spaced from the glass sheet and the convex shaping member 20 is entirely out of contact with the glass. This arrangement of the glass shaping members relative to the glass sheet is shown in FIG. 1 of the drawings.

The concave shaping member 24 continues its movement with the lower edge portion 27 of its concave shaping surface 25 making contact with the major surface of the glass sheet and tilting the glass sheet so that its lower edge portion 27 moves towards the convex shaping member 20 until the angle of tilt becomes sufficient for the concave shaping surface 25 to develop a sliding support for a component of the mass of the glass sheet that is roughly proportional to the sine of the angle of tilt. At this part of the bending cycle, as shown in FIG. 2, the convex shaping member 20 is still spaced from the glass sheet.

The concave glass shaping member 24 is stopped and the convex glass shaping member 25 engages the opposite surface 38 of the glass sheet. The tilting described above may cause the heat-softened glass sheet to begin to droop with surface 37 beginning to assume a convex configuration and surface 38 a concave configuration before surface 37 is engaged by the convex shaping member 25.

The glass sheet completes its change of shape in response to the pressurized engagement between the two opposing glass shaping members. As the glass sheet is shaped about a horizontal axis of curvature, the upper edge is rigidly gripped by the glass gripping elements 19 of the tongs 18 and the bottom edge moves upward until its bottom edge surface is in horizontal alignment with the bottom edge portion 27 of the concave glass shaping member 25 at the time the bend is completed. Thus, the concave shaping member contacts only the major surface 37 of the glass sheet and does not contact the sharp corner line 40 during the shaping operation.

The ability of the concave glass shaping member constructed according to the present invention to avoid sliding contact with the sharp corner line 40 formed at the intersection between the major surface 37 and the bottom edge 39 of the glass sheet undergoing bending reduces the amount of wear and tear on the fiber glass cover for the concave shaping member. Mold covers of concave shaping members used in production lasted five times as long after the bottom edge of the concave shaping member was modified according to the teachings of the present invention compared to the duration of the fiber glass covers mounted on concave shaping members in use prior to the present invention.

The present invention involves no change in the construction of the convex shaping member compared to those disclosed in the earlier filed applicatitons of Dean L. Thomas, mentioned earlier. The rounded convex surface makes contact with the smooth major surface 38 of the glass sheet undergoing bending and does not engage the bottom corner lines formed at the intersection of the major surface 38 and the bottom edge surface 39. Therefore, the present invention is not needed to reduce wear of the cover for the convex shaping member.

The remainder of the glass shaping operation is conventional. The glass sheets are heated while being transported through a continuous tunnel-like furnace and brought to a desired temperature before they are subjected to the shaping operation described hereinabove. After the glass sheet has been shaped by pressurized engagement of glass shaping members on the opposite surfaces thereof as previously described, both glass shaping members are retracted to permit the shaped glass sheet to move rapidly from the glass shaping station to a glass tempering apparatus. The retracted glass shaping members are in position to receive the next glass sheet heated to a temperature sufficient for its shaping by press bending.

In order to provide a complete disclosure, a typical commercial operation exemplifying the various aspects of the present invention will be described.

*Example I*

The following details are supplied of a typical comcercial operation to produce curved windows for telephone booths. This is the operation in which the five-fold increase of cover wear mentioned above resulted from use of the present invention.

The windows were formed from glass sheets 35 inches long, 20 inches wide, and having a nominal thickness of 7/32 of an inch. The glass sheets were composed of sheet glass, a conventional soda-lime-silica glass formed by the Pennvernon (Registered Trademark) process.

The sheets were gripped along their 35 inch length by a series of 4 tongs disposed substantially equal distances intermediate each of the four quarters of the length of the glass. The 20 inch dimension was suspended vertically. The glass sheets were gradually heated about 4 minutes while being conveyed through a tunnel-like furnace at a constant speed until their surface temperature reached about 1225 degrees Fahrenheit. About 4 seconds elapsed in moving each sheet in succession to its proper position at the glass shaping station after it attained the desired surface temperature.

The glass shaping members were moved obliquely upward toward one another in converging paths forming an angle of 4½ degrees with a horizontal plane. The bottom edge of the concave glass shaping member contacted the glass sheet at its major surface 37 about ½ inch above the bottom edge surface thereof and continued to move toward the convex glass shaping member until the glass was tilted with its bottom edge 39 displaced 3 inches beyond the vertical plane in which the upper edge was suspended. The convex shaping member moved into pressurized engagement with the opposite surface 38 of the glass sheet. The shaping surfaces were shaped to provide a uniform 18 inch radius of curvature about a horizontal axis of bending.

It took about 2 seconds for the glass shaping members to close against one another and impress their shapes onto the opposite major surfaces of the heat-softened glass sheet. The glass shaping members were held in pressurized contact with the opposite surfaces of the glass sheet for about 2 seconds and then were retracted. The shaped glass sheet was immediately transported through a quenching station where the glass was suddenly chilled by exposure to cold air directed against the opposite curved major surfaces of the glass sheet.

The size of the concave shaping member was such that its bottom edge portion 27 contacted the glass sheet at its smooth major surface 37 about ½ inch above its bottom edge surface 39 when the glass sheet was flat and substantially aligned with the glass sheet bottom edge corner 40 when the glass sheet was shaped. Each shaping surface was tilted in such a manner that the portion thereof tangent to a vertical plane was intermediate the upper portion and the mid-portion of the vertical dimension of the shaping surface. Preferably, tilting was sufficient to enable the bottom edge 27 of the concave glass shaping member 25 to displace the bottom edge 39 of the glass sheet at least 3 inches before its top edge 26 contacted the glass sheet.

A description of an illustrative embodiment of the present invention has been made for the purpose of illustration. Many equivalent devices and modes of operation will become obvious in the light of the present disclosure. Reference to the scope of the present invention may be obtained from the claimed subject matter which follows

What is claimed is:

1. In the art of press bending glass sheets wherein a flat glass sheet while heat-softened is supported substantially vertically between a pair of glass shaping members having complementary convex and concave shaping surfaces provided with covers subject to wear defining a curvature about a horizontal axis of curvature and shaped to conform to the shaping surfaces by engaging the heat-softened glass sheet in pressurized engagement therebetween, the improvement comprising first contacting one major surface of the glass sheet slightly above its bottom edge with the bottom edge portion of the concave shaping member, tilting said glass sheet so that its bottom edge moves toward said convex shaping member, and then moving said convex shaping surface into pressurized engagement against the opposite major surface of the glass sheet until the glass sheet is shaped into conformity with said complementary shaping surfaces while keeping the corner line formed between said major surface contacted by said concave shaping member and the bottom edge surface of the glass sheet out of contact with said concave shaping member to reduce the rate of wear of said cover for said concave shaping member.

2. The improvement according to claim 1, wherein the portion of the major surface of the glass sheet originally contacted by the bottom edge portion of the concave glass shaping member is spaced above the bottom edge of the flat glass sheet a distance substantially equal to the distance said bottom edge is displaced upward during said glass shaping operation.

3. In the art of bending a heat-softened glass sheet into a shape having a curvature disposed about a horizontal axis by engaging the glass sheet in pressurized engagement between opposed complementary glass shaping members having concave and convex shaping surfaces curved about a horizontal axis of curvature to provide a leading lower edge portion of said concave member and provided with covers subject to wear, the improvement comprising supporting said glass sheet in an upright position between said shaping members and moving said shaping members, prior to said shaping of said sheet therebetween, toward the opposite major surfaces of said glass sheet until only said leading lower edge portion of the concave shaping surface initially contacts said glass sheet at a position above the lower edge of said glass sheet and said cover for said concave member is prevented from rubbing against the sharp corner formed between the major surface and the lower edge surface of said glass sheet while said sheet is shaped, thereby reducing rubbing wear and extending the effective life of said cover.

References Cited

UNITED STATES PATENTS 3,136,618    6/1964    Valchar et al. _____ 65—289 X

DONALL H. SYLVESTER, *Primary Examiner.*

A. D. KELLOGG, *Assistant Examiner.*